United States Patent [19]
Green

[11] 3,882,016
[45] May 6, 1975

[54] FLOTATION MACHINE AND IMPELLER THEREFOR

[76] Inventor: Charles A. Green, Apartado 82, Chihuahua, Parral, Mexico

[22] Filed: June 17, 1974

[21] Appl. No.: 479,749

Related U.S. Application Data

[63] Continuation-in-part of Ser. No. 430,073, Jan. 2, 1974, abandoned, which is a continuation-in-part of Ser. No. 301,883, Oct. 30, 1972, Pat. No. 3,843,101.

[52] U.S. Cl................ 209/169; 210/219; 210/221; 261/87
[51] Int. Cl............................................. B03d 1/14
[58] Field of Search....... 209/168, 169; 210/44, 219, 210/220, 221; 261/87, 93

[56] References Cited
UNITED STATES PATENTS

| | | | |
|---|---|---|---|
| 1,381,673 | 6/1921 | Sherwood | 209/169 X |
| 2,182,442 | 12/1939 | Booth | 209/168 |
| 2,217,231 | 10/1940 | Morse | 261/87 |
| 2,573,520 | 10/1951 | Wasley et al. | 209/169 |
| 2,713,477 | 7/1955 | Daman | 209/168 X |
| 2,966,266 | 12/1960 | Coke | 209/168 |
| 2,973,095 | 2/1961 | Anderson et al. | 209/169 |

Primary Examiner—John Adee
Assistant Examiner—Robert H. Spitzer
Attorney, Agent, or Firm—Horace B. Van Valkenburgh; Frank C. Lowe

[57] ABSTRACT

An impeller for a flotation machine having an upper circular plate with a central hole for supplying air through a hollow shaft to the underside, and a lower circular plate having a larger central hole and sloping toward the first plate to the outside, together with a series of radial, upright vanes between the plates which are thicker at their outer edges than at their inner edges, both of which are rounded. A series of radial fingers shorter than the vanes extend upwardly from the periphery of the upper plate. These fingers are also thinner at their inner rounded edges and thicker at their outer rounded edges.

The impeller may be utilized with an open top stabilizer including radially outwardly extending vanes which are thicker at their inner rounded edges and thinner at their outer edges. The stabilizer vanes may be formed of center plates welded to a support bar structure extending around either the outside of the vanes or disposed angularly of the lower outer corner thereof. The stabilizer vanes and support bars may be covered with rubber, which may be molded to provide the desired rounded inside edge and variations in thickness. In the preferred stabililzer, a rubberized top cover which covers the space above the vanes, or a cover formed as a quadrant at each corner or as a series of annular rings, may be used. The cover merely rests on the vanes but hold down rods may extend from the cover or parts thereof to the inside of the tank walls.

Both stabilizer vanes and the impeller are spaced above the bottom of the tank of the flotation machine, so that a recirculation of pulp around and above the impeller between the stabilizer vanes is obtained, as well as an outward discharge of pulp by the fingers into the spaces between the stabilizer vanes. Not only is the efficiency increased, but also the problem of "sanding up" in the bottom of the tank is overcome, particularly when the cover for the outward vanes is utilized.

14 Claims, 5 Drawing Figures

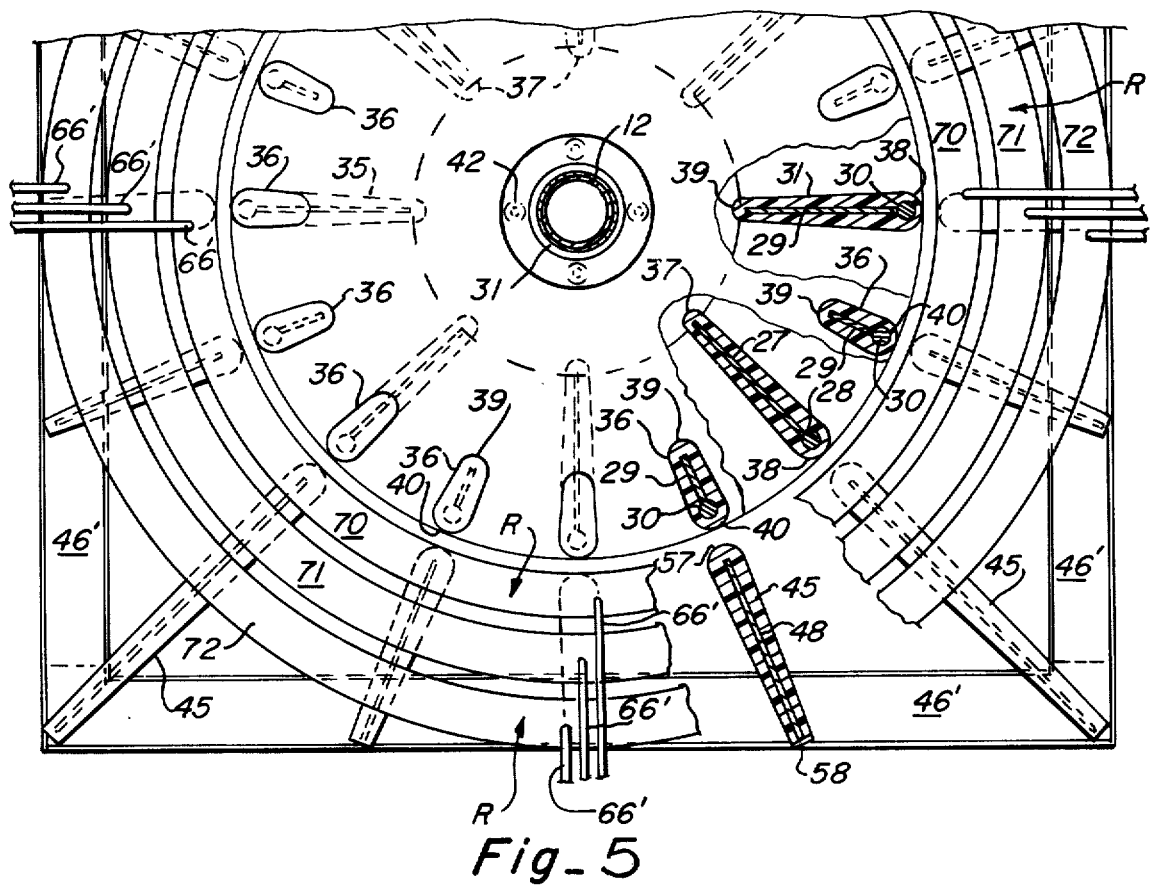
Fig_5
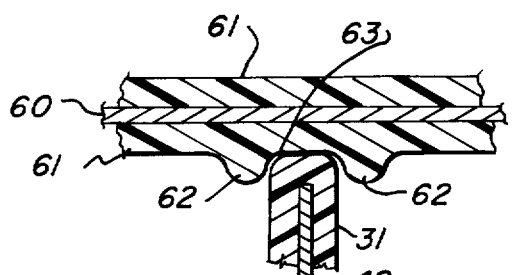
Fig_3
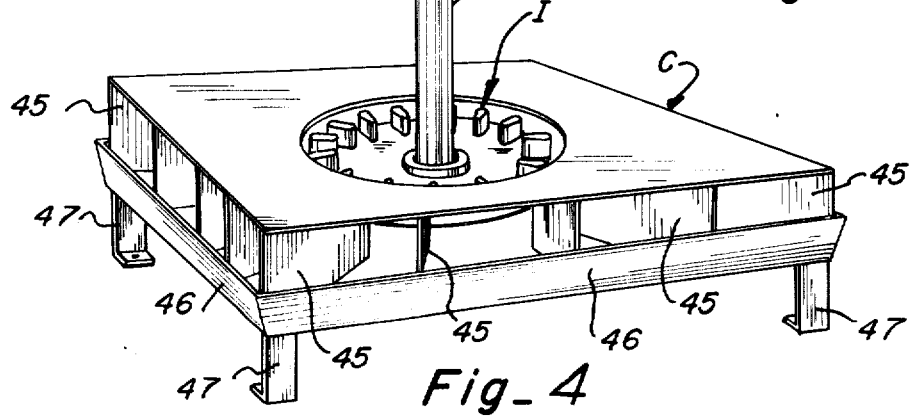
Fig_4

FLOTATION MACHINE AND IMPELLER THEREFOR

This application is a continuation-in-part of my prior application Ser. No. 430,073 filed Jan. 2, 1974, now abandoned, in turn a continuation-in-part of my prior application Ser. No. 301,883, filed Oct. 30, 1972, now U.S. Pat. No. 3,843,101.

This invention relates to flotation machines which are utilized in separating mineral to be recovered, from gangue or waste, through the lifting of desired particles by bubbles of air or other suitable gas, with the addition of suitable reagents which insure or assist in the frothing and lifting of the particles.

For flotation, the raw ore is ground or otherwise comminuted to a relatively small size, such as to below one-fourth inch in size to micron sizes.

Prior flotation machines have had a tendency to "sand up", i.e. the ground ore tends to collect in the bottom of a flotation cell and tends to render the machine ineffective, sometimes even stalling the impeller of the machine. The coarse particles more usually produce sanding difficulties, although this problem is not unknown with fine particles. In addition to the difficulties in operation, the tendency for the machine to sand up also decreases its efficiency and effectiveness in removing the desired particles. In addition, the level of pulp in most flotation machines tends to oscillate upwardly and downwardly, thereby decreasing both the effectiveness and efficiency of the machine.

Among the objects of this invention are to provide a novel flotation machine and impeller therefor; to provide such a flotation machine in which the tendency for sanding up is materially decreased; to provide such a flotation machine in which the effectiveness and efficiency is increased; to provide such a flotation machine in which the tendency for the pulp level to oscillate is decreased; to provide a novel impeller for a flotation machine; to provide such an impeller which will, with an appropriate stabilizer or diffusion vanes, tend to alleviate the problem of sanding up; and to provide such an impeller which is effective and efficient in operation.

In accordance with this invention, the impeller of the flotation machine is provided not only with a lower agitating and pumping section to which the aeration gas is supplied, but also an upper pumping section which recirculates the pulp from its center outwardly and through the stabilizer or diffuser into which the lower aeration and pumping section discharges. Such recirculation of the pulp, which has previously been agitated and forced outwardly, not only increases the recovery rate and efficiency of the machine, but also decreases the tendency for the pulp level to oscillate. In further accordance with this invention, the stabilizer vanes are provided with a cover which, for smaller machines, may extend over substantially the entire area above the stabilizer vanes but for larger machines, may be quadrants over the corners of the stabilizer vanes or a series of concentric, spaced rings.

Preferred embodiments of this invention are illustrated in the accompanying drawings, in which:

FIG. 3 is a sectional detail, on an enlarged scale and taken along line 3—3 of FIG. 2;

FIG. 4 is a perspective view of an impeller and stabilizer similar to those of FIG. 1 but with an alternative cover for the stabilizer; and FIG. 5 is a partial top plan view of an impeller and stabilizer similar to those of FIG. 1 but with a further alternate cover for the stabilizer.

Figure 1:
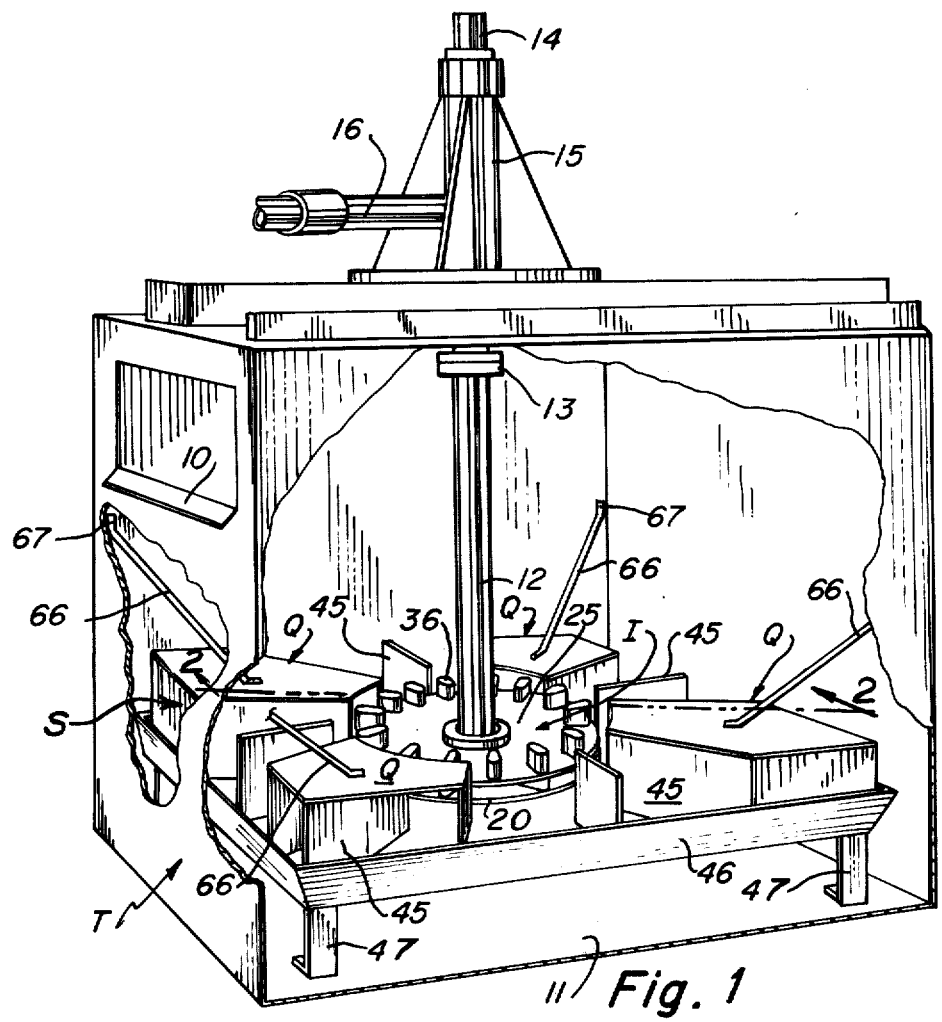
FIG. 1 is a perspective view of a flotation machine constructed in accordance with this invention, with a portion of the exterior of the tank being broken away to show the impeller and stabilizer within the tank.

The flotation machine of FIG. 1 includes a tank T which may be essentially conventional in construction, being generally square or rectangular in lateral configuration, and having a froth overflow lip 10 at one end and a bottom 11. The froth overflow lip 10 may be provided at one or at both opposite sides, while a conventional feed inlet and weir structure for the outflow of tailings or material to be discarded may be on the side adjacent the overflow or opposite thereto. The tank may also be provided with a pulp level control weir which essentially determines the depth of the froth. These elements are all conventional and are therefore not shown, except for the froth overflow lip 10.

Installed normally centrally within the tank T and suspended by a tubular shaft 12, through which air may be supplied to the underside thereof, is an impeller I, which will be described in detail later. The shaft 12 is connected by a coupling 13 with a hollow shaft 14 which extends upwardly within a bearing housing 15, within which air is supplied through an air pipe 16 to the interior of the hollow shaft. Shaft 14, the upper end of which may be provided with a suitable plug, extends above the bearing housing 15 and is connected, through a suitable reduction transmission, with a conventional drive motor (not shown).

Figure 2:
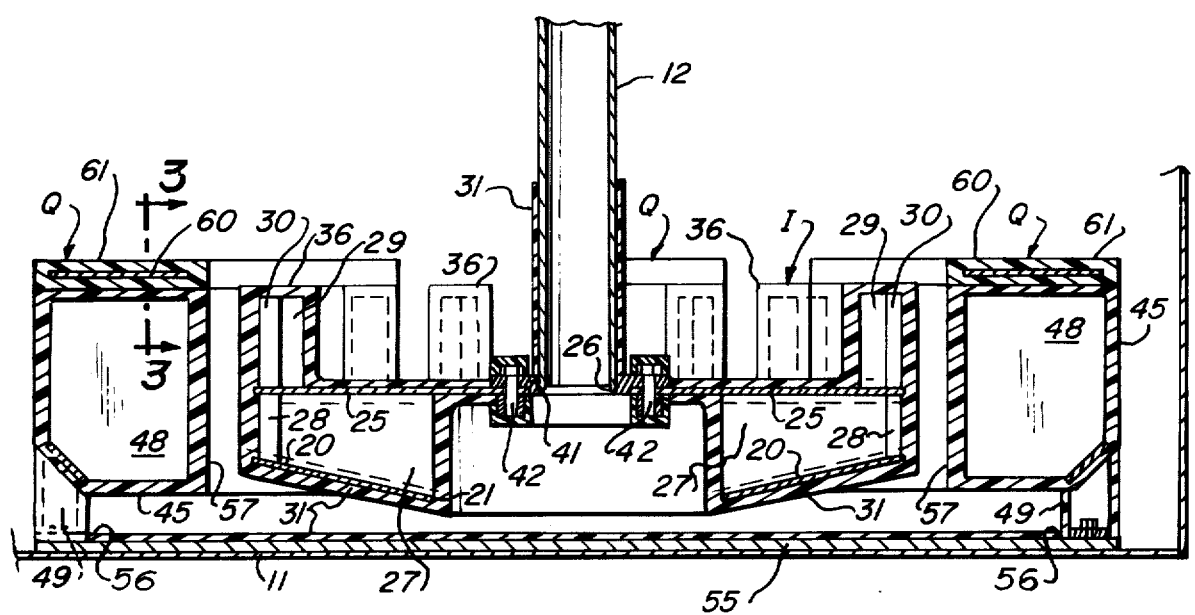
FIG. 2 is a central vertical section, taken along line 2—2 of FIG. 1, through the impeller and stabilizer thereof.

The skeleton of the impeller I, prior to the molding of a suitable corrosion and abrasion resistant elastomer thereto, is shown in FIG. 2. Thus, the impeller I includes a lower plate 20 which is circular and provided with a circular hole 21 at the center. The impeller also includes an upper plate 25 having a central opening smaller in diameter than hole 21 in the lower plate but surrounded by bolt holes for attachment of the lower end of shaft 12 thereto. Lower plate 20 also slopes upwardly and outwardly from its central opening to its outer periphery. The angle of the slope of lower plate 20 may be altered considerably, although an angle of approximately 13° to the horizontal may be found to be suitable in many instances. A series of pump vane plates 27 are attached, as by welding, in perpendicular relation to and between the lower plate 20 and upper plate 25, with a rod or post 28 extending between the plates 20 and 25 at the outer edges of the vane plates 27. Both the vane plates 27 and the rods 28 are attached in a suitable manner, as by welding, to the upper and lower plates and to each other. Upstanding from the upper plate 25 is a circumferentially spaced series of finger plates 29 attached at their outer edges to upstanding rods or posts 30 and desirably welded to the top side of plate 25. The number of vanes, determined by the number of vane plates 27, may be varied considerably, although a series of radially extending, equally spaced vane plates 22 ½° apart will be found suitable in many instances. Also, the number of finger plates 29 may be varied, although twice the number of finger plates as vane plates may be found suitable in many instances. In the event that the number of vane plates and finger plates shown are utilized, alternate finger plate rods 30 may be integral with the vane rods 28, merely extending through a hole drilled in the upper plate 25 at an appropriate position. After the skeleton of the impeller I has been assembled, the entire impeller is provided with a covering 31 of an elastomer having suitable corrosion and abrasion resistant qualities. The thickness of the elastomer coating may be varied considerably, in accordance with the useage, and may also be varied at different portions of the impeller, depending upon the wear expected at such portions. The elastomer coating may be rubber or plastic, such as a suitable polyvinyl chloride.

The elastomer coating 31 of the impeller is molded on the impeller skeleton so that a series of vanes 35, as in FIG. 5, and a series of upstanding fingers 36 are formed, with both the vanes and fingers extending radially and each having a greater lateral thickness adjacent its outer edge than adjacent its inner edge. Also, the vanes each have a convex, rounded and conveniently arcuate inner edge 37 and outer edge 38, while the fingers 36 also have a convex, rounded and preferably arcuate inner edge 39 and outer edge 40. The radial length of the fingers 36 is preferably less than the radial length of the pumping vanes 35, such as about ¼ to ½ the length thereof. The fingers 36 have free, i.e. unconnected and uncovered, upper ends. The impeller I, as in FIG. 2, is mounted on the lower end of shaft 12 by a ring 41 which is secured, as by welding, to the lower end of the shaft, and a series of bolts 42 which extend through bolt holes as in FIG. 2. Both the bolts 42 and the nuts therefor are provided with an elastomer coating 31 which, in the case of rubber, is applied to the assembly, after attachment to the shaft, and then vulcanized. If desired, the exterior of shaft 12 may also be coated with an elastomer. Since air only passes down the inside of the shaft, it is unnecessary to provide an elastomer coating there.

It will be evident from the previous description that the impeller I of this application may be the impeller disclosed and claimed in my application Ser. No. 301,883 but reversed in position.

The stabilizer S includes a plurality of vanes 45, as in FIG. 1, which extend radially from the impeller, the vanes being rectangular but of differing lengths, since the vanes extend outwardly to a supporting bar 46 which has a rectangular or square configuration corresponding to the inside of the tank T but disposed at about 45° to the plane of the tank bottom. The inner edges of the vanes 45 are spaced a short distance from the periphery of the impeller I, preferably with a clearance, such as 1 inch, greater than that necessary for normal clearance, to accommodate lateral whipping of the suspended impeller as it comes up to speed. The support bars 46 are, in turn, supported at each of the four corners by an angular bracket 47 which is mounted on the bottom of the tank and holds the lower edges of the stabilizer vanes 45 in spaced relation to the tank, with the impeller I being suspended at a height such that the clearance between the lower end thereof and the bottom of the tank is approximately the same as the clearance between the lower edges of the stabilizer vanes and the bottom of the tank. If desired, the stabilizer vanes 45 may be of equal length, with the supporting bars 46 forming a circle.

Each vane 45 of the stabilizer S may be merely a rectangular plate 48, as in FIG. 2, welded at the outside to the supporting bar 46 being bevelled at the lower outside corner, so that each supporting bar 46 will be disposed at about 45° to the plane of the tank bottom.

The support bars 46, as well as the plates 48 and the brackets 47, are provided with an elastomer covering 31, conveniently molded thereto, and if rubber, then vulcanized. In addition, the bottom 11 of the tank is provided with a wear pad 55 having a molded elastomer covering 31 thereon which extends between the walls of the tank, except for cutouts 56 at the corners, to accommodate the brackets 47. As in FIG. 5, the elastomer covering for the stabilizer or diffuser vanes 45 is preferably molded so that the lateral thickness of the vanes will be greater adjacent the inner edge than adjacent the outer edge, i.e. directly opposite to the configuration of the pumping vanes 35 and the fingers 36. Also, the inner edge 57 of each diffuser vane 45 is convex and rounded, preferably arcuate, while the outer edge 58 may have any configuration, such as transverse to the plane of the plate 48.

As indicated previously, the lower edge of the impeller is preferably spaced the same distance from the bottom of the tank as the lower edges of the vanes 45. However, the upper edges of the fingers 36 of the impeller may be approximately the same height, or spaced a short distance below the upper edges of the diffuser vanes 45. Also, while the pump vanes 35 and fingers 36 extend radially of the impeller, each may be curved, to increase the pumping action in one direction, although a radial position of the vanes and fingers may be preferred, since after the elastomer on one side of the vanes and fingers has worn sufficiently to require replacement, the direction of rotation of the impeller may be reversed and the other side used until worn.

In accordance with this invention, a series of covers Q of FIGS. 1–3 for the stabilizer S may be provided to increase the efficiency of the machine and also to assist in preventing sanding up. Cover quadrants Q are adapted particularly for intermediate size machines, covering the area above the corner stabilizer vanes 45, as in FIG. 5, each comprising a quadrant shaped plate 60 of FIG. 6 having an elastomer covering 61 having suitable corrosion and abrasion resistant properties. Elastomer 61 is molded on both the top and bottom, as well as the inner and outer edges of each plate 60 to provide protection for the entire plate. Each quadrant shaped cover Q corresponds to the area above the three vanes 45 at each corner of the stabilizer. Each cover Q rests on stabilizer S, being maintained partially against sudden surges of flow in the tank by its weight and being retained in position by a series of spaced, parallel, depending ridges 62 on the underside, as in FIG. 3, providing a slot 63 therebetween in which the upper edge of a corresponding vane 45 is received. Such depending ridges prevent the quadrants from twisting on the vanes, but to prevent uplift due to surges in the tank and the forces exerted by upward flow between the vanes, an elastomer covered rod 66 may be welded at its lower end to the center plate of each quadrant and extend diagonally upward toward the corresponding corner of the tank, to a bracket 67 by which the upper end of the rod may be attached to the tank, as by an elastomer covered bolt or stud. As will be evident, each rod 66 will resist an upward thrust against the corresponding quadrant Q, thereby maintaining the latter securely in position.

In further accordance with this invention, the cover may extend over substantially the area of the stabilizer, for smaller machines, such as the alternative cover C of FIG. 4. Cover C may be similar in construction to quadrant covers Q, i.e. comprising a center horizontal plate of appropriate configuration provided with elastomer on the top, bottom and each edge. Cover C is preferably provided on the underside with radial, depending ridges corresponding to ridges 62 of FIG. 3, and comprising a central pair of ridges between which the upper edge of each central vane 45 fits and outer depending ridges abutting the upper edge of each outer vane 45. As will be evident, there is little tendency for the cover C to slip on the stabilizer, since the ridges radiate outwardly from the inner edge of the cover in a circular pattern. However, if there is any tendency for the position of cover C to be disturbed by surges in the tank, cover C may be provided with a set of rods corresponding to rods 66 and extending upwardly to and attached to the corner of the tank or to a side wall thereof.

An alternative ring cover R of FIG. 5 is also particularly adapted for the larger sizes of machines and comprises a series of annular rings, such as rings 70, 71 and 72, which have successively larger diameters and provide a space therebetween. The relationship between the width of each ring and the space between the rings may be any desired proportion, such as the width of the rings being on the order of eight times the space between. The widths of the respective rings need not be uniform, as shown, while the spacing between rings and the number of rings may also be varied. However, it will be noted that the spaced rings permit upward flow between them and also at the corners, while the quadrants Q permit flow between them. In each instance, there is also upward flow outwardly of the stabilizer, i.e. between the stabilizer and the tank walls.

Each ring 70, 71 and 72 is preferably provided on the underside with pairs of depending ridges corresponding to ridges 62 of FIG. 3, each pair providing a slot between them to receive the upper edge of vane 45. However, to better resist upward flow surges and maintain the rings in position, an elastomer covered rod 66 preferably extends diagonally upwardly from each ring to a bracket corresponding to bracket 67 of FIG. 1, for attachment to a tank wall, as at the center of each wall by a bolt or stud.

It will be understood that the cover C or covers Q or R may be utilized with an impeller installed as shown in my aforesaid copending application Ser. No. 301,883.

As pointed out in the aforesaid application, it has been observed that there are essentially three zones in the machine constructed in accordance therewith, i.e. a first or lower zone which extends from the bottom of the tank upwardly to approximately 2 or 4 inches above the top of the stabilizer S, in which zone there is violent agitation and some feed to the pump of the impeller I. The second or intermediate zone is above the first zone and extends up to approximately ⅗ to ¾ of the height of the pulp level determined by the position of the froth overflow lip 10 of FIG. 1 and the weir bars for waste, in which the pulp becomes progressively quiescent, with the remainder of the feed around shaft 12 downwardly toward the upper pump of the impeller. The third or upper zone, approximately the upper ⅓ to ¼ of the pulp body, is relatively quiescent, except for air bubbles carrying recoverable material upwardly in this zone. In this zone, the mechanical lifting of particles, extending through substantially the entire range of sizes, occurs without material assistance from the pumping effect of the impeller.

Considering next FIGS. 1–3 and 5, in which the stabilizer is provided with a cover having less than its area, the lower zone of violent agitation will extend to above the cover and also around the edges of the tank and inwardly therefrom for an appreciable distance, above the cover. The spaces between the quadrants or the rings permits upward flow from the stabilizer vanes to increase agitation in that portion of the lower zone above the stabilizer vanes. The remaining zones are essentially as described above, but the cover does not detract from the efficiency of the machine. The advantage of the cover is realized when the machine is stopped and then restarted, since the cover produces a downward as well as an outward flow, which tends to reduce accumulation of sand on the bottom when the machine is stopped. Also, this downward flow, when the machine is started up again after being stopped, tends to clear sand from the bottom of the tank which has settled during the stoppage. As will be evident, the pumping vanes of the closed portion of the impeller will produce a suction at the center of the impeller, which will tend to suck sand off the bottom of the tank and thereby facilitate a start up after the machine has been shut down for several minutes. The influx of air at the center of the impeller, on the underside, does not appear to have any adverse effect against this suction effect. As indicated previously, the quadrant covers Q and ring cover R are particularly adapted for use with larger sizes of machines.

Considering next FIG. 4, the cover C is particularly adapted for smaller machines. Thus, the cover C produces a downward flow which tends to clean the bottom, thereby reducing the amount of sand on the bottom prior to and during stopping of the machine, as well as cleaning off settled sand when the machine is restarted.

As will be evident, the quadrant covers Q, cover C and ring covers R could be made integral with the stabilizer S, but this would unduly complicate the molding of the elastomer coating thereon, particularly in the area between the cover and the supporting bar 46. Thus, the separate molding of the elastomer on the cover facilitates and reduces the cost of production of both the stabilizer and the cover therefor. Of course, the rods 66 and 66' permit the cover to be attached to the tank, as is the stabilizer.

When smaller machines provided with the stabilizer cover C of FIG. 4 and larger machines provided with the quadrants Q of FIGS. 1–3 were placed in operation, not only was the percentage of mineral recovery further increased, over the results set forth in said application Ser. No. 301,883, but also the power consumption and the amount of reagents necessary to use was further reduced.

When any flotation cell is stopped, there is a tendency for sand to settle out and collect in the bottom of the tank which, for a shutdown of between 5 and 10 minutes, but without further feed, required manual assistance in the case of previous machines for starting up after such a shutdown. However, the machines of the present invention started up much more readily and without manual assistance.

Although a preferred embodiment of this invention has been illustrated and described and certain variations thereof shown or indicated, it will be understood that other embodiments may exist and that other variations may be made, all without departing from the spirit and scope of this invention.

What is claimed is:

1. A rotatable impeller for a flotation machine having a tank, comprising:
   a circular lower plate;
   a circular upper plate concentric with and spaced from said lower plate, said plates each having a circular central opening therein;
   a series of vanes extending generally radially and disposed between said plates, said vanes being constructed and arranged to pump pulp and the like from said central opening of said first plate and discharge the same from the periphery of the space between said plates;
   a series of radial fingers spaced around the periphery of said upper plate and extending upwardly therefrom, said fingers having free upper ends and a radial extent less than that of said vanes; and
   means connected to said lower plate at said central opening for supplying fluid under pressure to the underside of said impeller and for supporting said impeller above the bottom of said tank.

2. An impeller as defined in claim 1, wherein both the inner upright edge and the outer upright edge of said vanes is rounded and convex.

3. An impeller as defined in claim 1, wherein:
   said fingers are equally spaced about the periphery of said plate and have a lateral thickness adjacent the outer edge greater than adjacent the inner edge thereof.

4. An impeller as defined in claim 1, wherein:
   the vertical distance between said upper and lower plates is greater adjacent said central opening than adjacent the periphery of said plates;
   the lateral thickness of said vanes is greater adjacent the periphery of said plates than adjacent said central opening;
   said vanes are equally spaced, and each vane has substantially the same lateral thickness at different points along the radial length thereof as the other vanes;
   both the inner upright edge and the outer upright edge of said vanes is rounded and convex;
   said upstanding fingers are equally spaced about the periphery of said plate, have a radial length less than the radial length of said vanes and have a lateral thickness greater adjacent the outer edge than adjacent the inner edge thereof; and
   both the inner upright edge and the outer upright edge of said fingers is rounded and convex.

5. In a flotation machine having a tank, the combination with an impeller having:
   a pair of vertically spaced, concentric circular plates, each of said plates having a central circular opening, with one opening being smaller than the other;
   a series of vanes extending generally radially and disposed between said plates;
   a series of fingers extending vertically from the upper of said plates and spaced around the periphery thereof;
   of a series of generally radial, upright vanes disposed outwardly from and surrounding said impeller adjacent the bottom of said tank;
   means for supporting said outward vanes with the lower edges thereof spaced from the bottom of said tank; and
   a hollow shaft for rotating said impeller about a vertical axis with the lower edge of said impeller spaced from the bottom of said tank, said hollow shaft supplying an aeration fluid to the underside of said impeller.

6. In a flotation machine as defined in claim 5, wherein:
   said outward vanes have a lateral thickness adjacent the inner edge greater than the lateral thickness adjacent the outer edge thereof; and
   the inner edges of said outward vanes are rounded and convex.

7. In a flotation machine having a tank:
   an impeller disposed adjacent the bottom of said tank, having upper agitation and pumping means for receiving pulp and the like centrally and discharging the same outwardly, and lower agitation and pumping means for receiving pulp centrally and agitating and moving outwardly pulp and the like at the underside of said impeller;
   means for rotating said impeller;
   means for supplying an aeration fluid to said lower agitating and pumping means;
   means surrounding said impeller, for receiving a pulp mixture from both said upper agitation and pumping means and said lower agitating and pumping means, for interrupting the circular flow of said pulp mixtures and for producing an intermixing of said pulp mixtures with said aeration fluid; and
   cover means overlying and engaging at least a portion of said pulp mixture receiving means.

8. In a flotation machine as defined in claim 7, wherein:
   said means surrounding said impeller comprises a series of generally radial, upright vanes disposed outwardly from and surrounding said impeller.

9. In a flotation machine as defined in claim 8, wherein:
   said outwardly disposed vanes comprise plates provided with a covering of a corrosion and abrasion resistant elastomer; and
   said cover means comprises at least one plate having a covering of a corrosion and abrasion resistant elastomer.

10. In a flotation machine as defined in claim 9, wherein:
    said elastomer of said cover plate is provided with depending ridges formed in spaced pairs with slots therebetween, for engaging the upper edge of a correspondingly disposed outward vane.

11. In a flotation machine as defined in claim 8, wherein:
    said cover means corresponds to substantially the entire area above said vanes.

12. In a flotation machine as defined in claim 8, wherein:
    said outward vanes extend radially from a position adjacent said impeller to a position spaced from said tank wall, the outer edges of said outward vanes being disposed in a generally rectangular configuration;

said cover means comprises a series of quadrant shaped plates covered with said elastomer and overlying at least two of said outward vanes between said impeller and a corner of said rectangular configuration; and means extending to the inside of said tank for holding said quadrant shaped covers downwardly against said outward vanes.

13. In a flotation machine as defined in claim 8, wherein:

said cover means comprises a series of annular rings of increasing diameter and spaced apart radially, each said ring having an elastomer covering and a series of depending ridges on the underside provided in spaced pairs with slots therebetween for engaging the upper edge of a corresponding positioned outward vane; and means extending to the inner wall of said tank for holding said rings against said outward vanes.

14. In a flotation machine as defined in claim 5, including:

cover means overlying said outward vanes and corresponding to substantially the entire area above said vanes.

* * * * *